(No Model.)

P. MOSES.
APPARATUS FOR TRIMMING CARBON POINTS.

No. 476,292. Patented June 7, 1892.

WITNESSES
Carroll J. Webster.
Floyd R. Webster.

INVENTOR
Philo Moses
By Wm Webster
atty

UNITED STATES PATENT OFFICE.

PHILO MOSES, OF FREMONT, OHIO.

APPARATUS FOR TRIMMING CARBON POINTS.

SPECIFICATION forming part of Letters Patent No. 476,292, dated June 7, 1892.

Application filed June 25, 1891. Serial No. 397,462. (No model.)

*To all whom it may concern:*

Be it known that I, PHILO MOSES, of Fremont, county of Sandusky, and State of Ohio, have invented certain new and useful Improvements in an Apparatus for and Process of Trimming Carbon Points; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an apparatus for trimming carbon points, and has for its object to provide means whereby the heretofore expensive process of trimming or scraping the web which connects the points as they leave the mold manually may be done mechanically.

A further object is to provide means whereby the trimming of the carbon points may be carried out while the points are heated, thereby insuring against breakage and more smoothly finishing the point, as well as providing for straightening the same.

A further object is to provide for automatically presenting the untrimmed points to the trimmer and removing the same therefrom when trimmed.

With these objects in view the invention consists in an apparatus for trimming carbon points mechanically, as will be hereinafter described, and pointed out in the claims.

Figure 1:
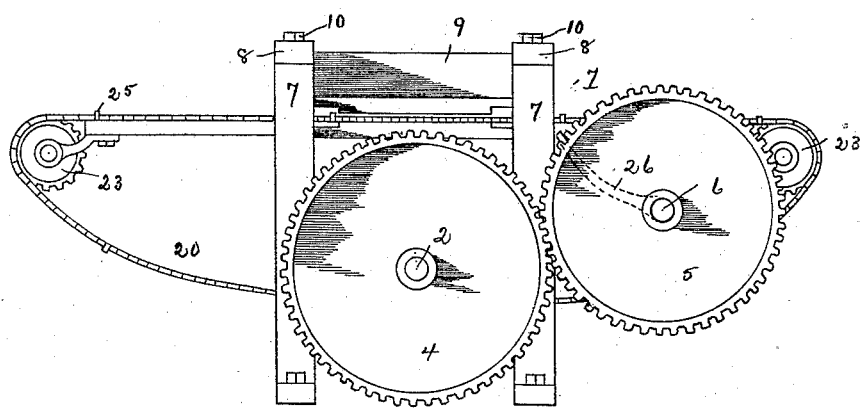
Figure 2:
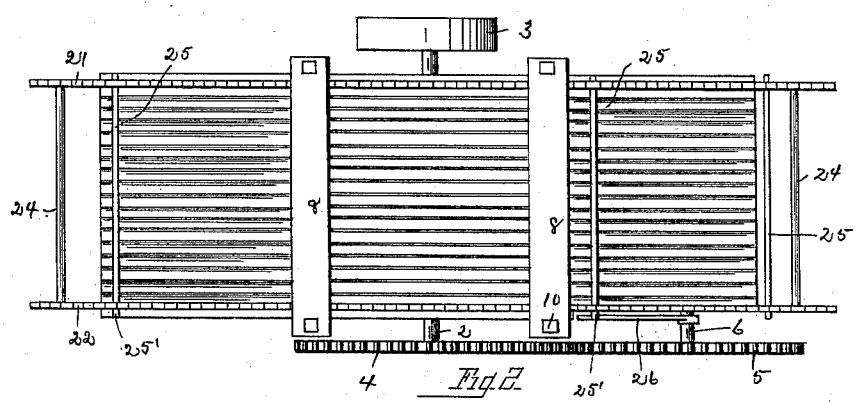
Figure 4:
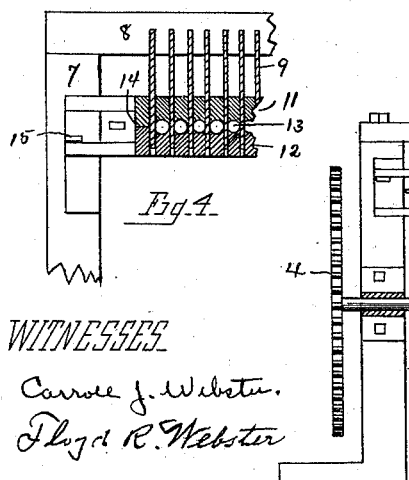
Figure 3:
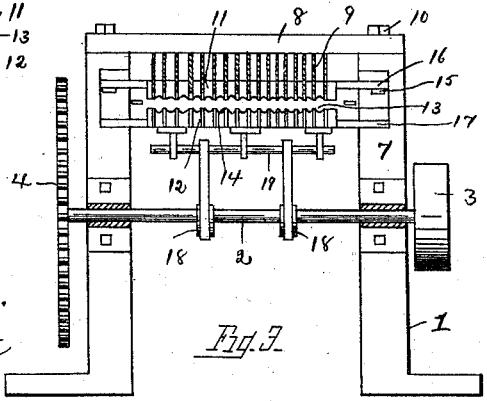

In the drawings, Figure 1 is a side elevation of a complete apparatus for carrying out my invention. Fig. 2 is a top plan view of the same. Fig. 3 is an end view in section showing the molds dropped to allow passing the carbon points thereto, and Fig. 4 is a detail view of the same with the molds raised to cause knives to pass between the points and trim the same.

In the art of making carbon points the several points in each mold are connected by a web located between and extending the entire length of the points, rendering it necessary to fracture the web, with the attending danger of fracturing the point in the operation, and then scraping the point at diametrically-opposite sides to remove the portion of web still remaining upon the point. In the operation of scraping the web each point is necessarily handled by the operator, who, by means of a knife or scraper, which is held in one hand while the point is grasped in the other hand, removes the web by two or more strokes of the scraper upon each side of the point. This operation is not only tedious, but expensive. I have succeeded in overcoming the breakage usual in fracturing the web and also the necessity of manually handling the points, as well as for providing for straightening any points that may have become warped in the operation of molding by means of the apparatus herein described.

In the description of the apparatus for carrying out my process, as illustrated in the drawings, I wish it understood that the device illustrated is merely a preferred form of mechanism, as the process may be carried out by a different mechanism without departing from the spirit of my invention.

Within a suitable frame 1 there is journaled a shaft 2, provided with a pulley 3 or other suitable means for receiving power to revolve the same, there being a gear 4 secured upon the opposite end, which intermeshes with a like gear 5, secured upon a shaft 6, journaled in parallel relation with shaft 2. Secured to uprights 7 of frame 1 is a top portion 8, in which is secured a series of knives 9, corresponding in number to the number of webs to be removed from the points as they come from the mold. Top 8 is preferably secured to the framing by bolts 10 to allow of easy removal of the top and knives when it is desired to substitute a perfect knife for a broken or imperfect one, or to sharpen any or all of the knives, which for this purpose are removably secured within top 8 in any preferred manner.

Knives 9 are of a width to project below their fastenings in the top a sufficient distance to pass between the points of a sheet of carbon points and trim the web therefrom.

I will now describe a preferred means for presenting the web of the sheet of carbon to the knives.

11 designates the upper and 12 the lower section of a carbon-holder, each section being formed with nearly-semicircular recesses 13, which being in coincidence when the sections are closely assembled to form openings into which the carbon point may rest, the wall 14 of each recess being of a height equal to less than a complete semicircle, the thickness of the web between the points, so that when the sheet of carbon points is received from the mold and is placed within the holder it is held firmly by reason of the points resting in the recesses, as described, and the webs resting upon the walls 14. Each wall 14 is slitted longitudinally thereof to allow a knife 9 to pass through a section in which the wall is formed when the carbon-point holder is presented to the knives.

Both sections 11 and 12 of the carbon-point holder are movable vertically within the framing, the upper section being limited in its downward movement by stops 15, projecting from the uprights 7, upon which the extended ends 16 of the section may rest, the ends also acting as guides to the section. The lower section 12 is guided by the extended ends 17, and is vertically reciprocated by means of eccentrics 18, secured upon shaft 2, the eccentrics contacting with a transverse bar 19, secured to section 12, upon the under side thereof.

20 designates an endless carrier comprising sprocket-chains 21 and 22, respectively, which run over sprocket-wheel idlers 23, journaled upon shaft 24, secured upon the frame, there being rods 25 secured transversely of the frame to each chain, the rods being secured to the chains a sufficient distance apart to allow of moving a sheet of carbon into the carbon-holder and removing the trimmed carbons from the holder at each downward movement of the lower section 12.

Chain 20 is moved intermittently by means of an arm 26, secured upon shaft 6, the arm contacting with the projecting end 25' of a rod 25, whereby at each revolution of wheel 4 the wheel 5 and arm 26 are given one revolution, thereby causing arm 26 to move the carrier a distance to effect the removal of the trimmed points from the holder and to move a sheet of carbon into the holder, it being understood that during the further rotation of the arm 26 and while the carrier is at rest eccentrics 18 raise the carbon-holder and cause the knives to pass through the slots in the walls of the holder and trim the web from each carbon point.

While by my apparatus the points may be trimmed while in a cold state with greater ease and rapidity than by hand and greatly lessen the number of broken points, I am enabled to entirely avoid breakage and at the same time straighten the points by trimming the points while heated, and consequently prefer to trim the points while in this state, which results in producing a superior quality of carbon points.

It will be apparent that I may move the knives to the carbon-holder instead of moving the holders to the knives, and I may also employ knives with straight or irregular cutting-edges, as desired. I may also dispense with the cams 18 on shaft 2 and substitute therefor eccentrics and provide vertically-movable lifters for the carbon-holders, which are actuated by the eccentrics, in which case the lifters may be provided with an eccentric-strap to surround the eccentrics and be guided by brackets secured upon the under side of sections 12, the downward movement of said section being limited by stops similar to stops 15. I may also pass the endless carrier through plumbago to lubricate the grooves in the same and provide a revoluble brush to clean the grooves as the belt travels.

Instead of arm 26, secured upon shaft 6, I may secure an arm upon sprocket-wheel 23 and effect the same purpose.

What I claim is—

1. In an apparatus for trimming carbon points, a frame-work, and a stationary knife-carrier fixed thereto, in combination with a sectional carbon-holder adapted to open by gravity, a shaft carried by the frame-work, and eccentrics carried by the shaft and operating to close the carbon-holder and raise it into engagement with the knives.

2. In an apparatus for trimming carbon points, a frame-work carrying a stationary knife-carrier, and a vertically-movable carbon-holder, in combination with an endless carrier and mechanism bringing the carbon-holder into operative position with the knives and for intermittently moving the carrier forward after the operation of the knives.

3. In an apparatus for trimming carbon points, a frame-work carrying a carbon-holder having slots coincident with the webs of the carbon-sheets, in combination with a knife-carrier carried by the frame-work and means for moving the carbon-holder vertically into a position to cause the knives to enter the slots and sever the webs.

4. In an apparatus for trimming carbon points, a frame-work, and a stationary knife-carrier fixed thereto, in combination with a sectional carbon-holder, an endless carrier, and two shafts journaled in the frame-work, one of which shafts carries eccentrics for closing the carbon-holder and bringing it into engagement with the knives and the other shaft mechanism for moving the said carrier forward a predetermined distance to face the trimmed carbons.

In testimony that I claim the foregoing as my own I hereby affix my signature in presence of two witnesses.

PHILO MOSES.

Witnesses:
ROLLIN S. MCCULLOCH,
FRANK W. DORR.